US010284108B2

(12) United States Patent
Wang et al.

(10) Patent No.: US 10,284,108 B2
(45) Date of Patent: May 7, 2019

(54) THREE-PHASE BOOST RECTIFIER CIRCUIT AND CONTROL METHOD THEREOF, AND AN UNINTERRUPTED POWER SUPPLY

(71) Applicant: XIAMEN KEHUA HENGSHENG CO., LTD., Xiamen (CN)

(72) Inventors: Zhidong Wang, Xiamen (CN);
Yizhang Zeng, Xiamen (CN);
Chenghui Chen, Xiamen (CN);
Ninghuan Su, Xiamen (CN)

(73) Assignee: XIAMEN KEHUA HENGSHENG CO., LTD., Xiamen (CN)

( * ) Notice: Subject to any disclaimer, the term of this patent is extended or adjusted under 35 U.S.C. 154(b) by 196 days.

(21) Appl. No.: 15/537,887

(22) PCT Filed: Sep. 1, 2015

(86) PCT No.: PCT/CN2015/088721
§ 371 (c)(1),
(2) Date: Jun. 20, 2017

(87) PCT Pub. No.: WO2017/024641
PCT Pub. Date: Feb. 16, 2017

(65) Prior Publication Data
US 2017/0353126 A1 Dec. 7, 2017

(30) Foreign Application Priority Data
Aug. 13, 2015 (CN) .......................... 2015 1 0495221

(51) Int. Cl.
*H02J 1/08* (2006.01)
*H02M 7/217* (2006.01)
(Continued)

(52) U.S. Cl.
CPC ............. *H02M 7/2173* (2013.01); *H02J 9/06* (2013.01); *H02M 1/10* (2013.01); *H02M 7/219* (2013.01); *H02M 7/487* (2013.01)

(58) Field of Classification Search
CPC .................................................. H02M 7/2173
See application file for complete search history.

(56) References Cited

U.S. PATENT DOCUMENTS

2004/0155526 A1* 8/2004 Naden ........................ H02J 3/28
307/43
2010/0072819 A1 3/2010 Lee et al.
(Continued)

FOREIGN PATENT DOCUMENTS

CN        2909689 Y     6/2007
CN      101001051 A     7/2007
(Continued)

*Primary Examiner* — Daniel Kessie
(74) *Attorney, Agent, or Firm* — Gokalp Bayramoglu

(57) ABSTRACT

The invention relates to a three-phase boost rectifier circuit and a control, method thereof, and an uninterrupted power supply which contains at least first battery packs BAT+, second battery packs BAT−, and a boost rectifier module; the boost rectifier module comprises a first bidirectional thyristor SCR1, a second bidirectional thyristor SCR2, a third bidirectional thyristor SCR3, a fourth bidirectional thyristor SCR6, a first unidirectional thyristor SCR4, a second unidirectional thyristor SCR5, a first inductor L1, a second inductor L2, a third inductor L3, a three-phase fully controlled rectifier bridge, a first capacitor C1 and a second capacitor C2. The invention can ensure the balance of positive and negative bus's voltage without the balancing device under battery operated boost mode, while improving the efficiency and reliability of the battery operated boost mode.

18 Claims, 10 Drawing Sheets

(51) Int. Cl.
*H02M 7/219* (2006.01)
*H02J 9/06* (2006.01)
*H02M 1/10* (2006.01)
H02M 7/487 (2007.01)

(56) References Cited

U.S. PATENT DOCUMENTS

2014/0241016 A1* 8/2014 Ho .................. H02M 7/493
 363/40
2015/0194905 A1* 7/2015 White ................ H02M 7/2173
 363/126
2018/0342962 A1* 11/2018 Chen ................ H02M 3/33569

FOREIGN PATENT DOCUMENTS

| CN | 201430545 Y | 3/2010 |
| CN | 202679054 U | 1/2013 |
| CN | 103259326 A | 8/2013 |
| CN | 103427474 A | 12/2013 |
| CN | 104584407 A | 4/2015 |
| KR | 101399118 B1 | 5/2014 |

* cited by examiner

US 10,284,108 B2

THREE-PHASE BOOST RECTIFIER CIRCUIT AND CONTROL METHOD THEREOF, AND AN UNINTERRUPTED POWER SUPPLY

CROSS REFERENCE TO RELATED APPLICATIONS

This application is the national phase entry of International Application No. PCT/CN2015/088721, filed on Sep. 1, 2015, which is based upon and claims priority to Chinese Application No. CN201510495221.5, filed on Aug. 13, 2015, the entire contents of which are incorporated herein by reference.

TECHNICAL FIELD

The invention relates to the field of boost rectifier module and uninterrupted power supply, especially for a three-phase boost rectifier circuit with its control methods and uninterrupted power supply.

BACKGROUND OF THE INVENTION

The traditional duce-phase uninterrupted power supply (UPS) generally uses three-phase half budge rectifier boost topology that comprising a single battery pact which can only control the sum of voltage of positive and negative bus. In order to maintain the balance of the positive and negative bus's voltage, current technology usually adds a balancing device, as shown in FIG. 1. With the technical proposal, the cost and circuit complexity are increased, meanwhile the reliability of the boost in battery state is decreased. At the same time, the balancing device generates additional power consumption while maintain the balance of the positive and negative bus's voltage, which reduces the efficiency of the boost under battery state.

In addition, as shown in FIG. 2, the rectifier boost topology that use single battery pack with its negative pole connected with the negative pole of bus bar comprising the topology that applied to two level and three-level. However, in modular UPS, the multi module UPS needs to share the battery pack, and the positive and negative bus of each module UPS is independent. Therefore, the topology mentioned above cannot applied to modular UPS.

The modular UPS has high flexibility of power expansion and has easy online maintenance, which is the mainstream of the future development direction of high frequency UPS and has been widely used in banking, communications and data centers and other fields. As shown in FIG. 3, modular UPS is generally use three-phase positive and negative double boost rectifier boost topology that comprising dual battery pack, which can realize that multiple module share one battery pack and the positive and negative bus between different modules is independent. However, the topology just mentioned increase three inductors and three thyristor compared with the rectifier boost topology that use single battery pack.

SUMMARY OF THE INVENTION

The invention aims to provide a three-phase boost rectifier circuit with its control methods and uninterrupted power supply, which can ensure the balance of positive and negative bus's voltage without the balancing device under battery operated boost mode, meanwhile improve the efficiency and reliability of the battery operated boost mode.

To achieve the above purpose, the technology options of this invention are: a three-phase boost rectifier circuit, comprising first battery packs BAT+, second battery packs BAT−, and a boost rectifier module; the boost rectifier module comprising a first bidirectional thyristor SCR1, a second bidirectional thyristor SCR2, a third bidirectional thyristor SCR3, a fourth bidirectional thyristor SCR6, a first unidirectional thyristor SCR4, a second unidirectional thyristor SCR5, a first inductor L1, a second inductor L2, a third inductor L3, a three-phase fully controlled rectifier bridge, a first capacitor C1, a second capacitor C2; one end of the first bidirectional thyristor SCR1, one end of the second bidirectional thyristor SCR2 and one end of the third bidirectional thyristor SCR3 are respectively connected to the first phase of three-phase power, the second phase of three-phase power and the third phase of three-phase power; the anode of the first unidirectional thyristor SCR4 and the cathode of the second unidirectional thyristor SCR5 are respectively connected to the positive end of the first battery packs BAT+ and the negative end of the second battery packs BAT−; the negative end of the first battery packs BAT+, the positive end of the second battery packs BAT− and one end of the fourth bidirectional thyristor SCR6 are connected to the zero line of three-phase power; the cathode of the first unidirectional thyristor SCR4 and the other end of the first bidirectional thyristor SCR1 are both connected to the one end of the first inductor L1; the other end of the second bidirectional thyristor SCR2 and the other end of the fourth bidirectional thyristor SCR6 are both connected to the one end of the second inductor L2; the other end of the third bidirectional thyristor SCR3 and the anode of the second unidirectional thyristor SCR5 are both connected to the one end of the third inductor L3; the other end of the first inductor L1, the other end of the second inductor L2 and the other end of the third inductor L3 are respectively connected to the three-phase inputs of the three-phase fully controlled rectifier bridge; the two outputs of the three-phase fully controlled rectifier bridge are respectively connected to one end of the first capacitor C1 and one end of the second capacitor C2; the other end of the first capacitor C1 and the other end of the second capacitor C2 are both connected to the zero line of three-phase power.

Further, the three-phase fully controlled rectifier bridge is two-level power supplied three-phase bridge topology, which comprising a first switching device, a second switching device, a third switching device, a fourth switching device, a fifth switching device, a sixth switching device; the collector or drain of the first switching device, the collector or drain of the third switching device and the fifth switching device are connected as the first output of the three-phase fully controlled rectifier bridge; the transmitter or source of the second switching device, the fourth switching device and the sixth switching device are connected as the second output of the three-phase fully controlled rectifier bridge; the transmitter or source of the first switching device is connected with the collector or drain of the second switching device as the first phase input of the three-phase fully controlled rectifier bridge; the transmitter or source of the third switching device is connected with the collector or drain of the fourth switching device as the second phase input of the three-phase fully controlled rectifier bridge; the transmitter or source of the fifth switching device is connected with the collector or drain of the sixth switching device as the third phase input of the three-phase fully controlled rectifier bridge.

Further, the three-phase fully controlled rectifier bridge is three-level power supplied three-phase half bridge topology which is I-type three-level inverting topology unit, or three-level power supplied three-phase half bridge topology which is T-type three-level inverting topology unit.

Further, the three-level power supplied three-phase half bridge topology which is I-type three-level inverting topology unit comprising first switching device to twelfth switching device and first diode to sixth diode; the transmitter or source of the first switching device and the collector or drain of the second switching device are both connected to the cathode of the first diode; the transmitter or source of the fifth switching device and the collector or drain of the sixth switching device are both connected to the cathode of the third diode; the transmitter or source of the ninth switching device and the collector or drain of the tenth switching device are both connected to the cathode of the fifth diode; the transmitter or source of the third switching device and the collector or drain of the fourth switching device are both connected to the anode of the second diode; the transmitter or source of the seventh switching device and the collector or drain of the eighth switching device are both connected to the anode of the fourth diode; the transmitter or source of the eleventh switching device and the collector or drain of the twelfth switching device are both connected to the anode of the sixth diode; the anode of the first diode is connected with the cathode of the second diode; the anode of the third diode is connected with the cathode of the fourth diode; the anode of the fifth diode is connected with the cathode of the sixth diode; the collector or drain of the first switching device, the collector or drain of the fifth switching device and the collector or drain of the ninth switching device are connected as the first output of the three-phase fully controlled rectifier bridge; the transmitter or source of the fourth switching device, the transmitter or source of the eighth switching device and the transmitter or source of the twelfth switching device are connected as the second output of the three-phase fully controlled rectifier bridge; the transmitter or source of the second switching device and the collector or drain of the third switching device are connected as the first phase input of the three-phase fully controlled rectifier bridge; the transmitter or source of the sixth switching device and the collector or drain of the seventh switching device are connected as the second phase input of the three-phase fully controlled rectifier bridge; the transmitter or source of the tenth switching device and the collector or drain of the eleventh switching device are connected as the third phase input of the three-phase fully controlled rectifier bridge; the anode of the first diode, the anode of the second diode and the anode of the third diode are connected to the zero line of three-phase power.

Further, the three-level power supplied three-phase half bridge topology which is T-type three-level inverting topology unit comprising first switching device to sixth switching device and first diode to sixth diode; the transmitter or source of the first switching device is connected with the transmitter or source of the second switching device, the transmitter or source of the third switching device is connected with the transmitter or source of the fourth switching device, the transmitter or source of the fifth switching device is connected with the transmitter or source of the sixth switching device; the cathode of the first diode, the cathode of the third diode and the cathode of the fifth diode are connected as the first output of the three-phase fully controlled rectifier bridge; the anode of the second diode, the anode of the fourth diode and the anode of the sixth diode are connected as the second output of the three-phase fully controlled rectifier bridge; the anode of the first diode, the cathode of the second diode and the collector or drain of the first switching device are connected as the first phase input of the three-phase fully controlled rectifier bridge; the anode of the third diode, the cathode of the fourth diode and the collector or drain of the third switching device are connected as the second phase input of the three-phase fully controlled rectifier bridge; the anode of the fifth diode, the cathode of the sixth diode and the collector or drain of the fifth switching device are connected as the third phase input of the three-phase fully controlled rectifier bridge; the collector or drain of the second switching device, the collector or drain of the fourth switching device and the collector or drain of the sixth switching device are connected to the zero line of three-phase power.

Further, the first bidirectional thyristor SCR1, the second bidirectional thyristor SCR2, the third bidirectional thyristor, the first inductor L1, the second inductor L2, the third inductor L3, the first switching device, the second switching device, the third switching device, the fourth switching device, the fifth switching device, the sixth switching device, the first capacitor C1 and the second capacitor C2 forming a rectifier boost power stage circuit under commercial power supply mode;

The first battery packs BAT+, the second battery packs BAT−, the first unidirectional thyristor SCR4, the second unidirectional thyristor SCR5, the first inductor L1, the third inductor L3, the first switching device, the second switching device, the fifth switching device, the sixth switching device, the first capacitor C1 and the second capacitor C2 framing a rectifier boost power stage circuit under battery-operated mode.

The invention also provides a control method of the three-phase boost rectifier circuit which is recorded above:

when the commercial power supply is normal, make the first bidirectional thyristor SCR1, the second bidirectional thyristor SCR2 and the third bidirectional thyristor SCR3 in closed-state; meanwhile, make the first unidirectional thyristor SCR4, the second unidirectional thyristor SCR5, the fourth bidirectional thyristor SCR6 in open-state; at this time, the three-phase boost rectifier circuit works in the commercial power supply mode;

when the commercial power supply is abnormal, make the first bidirectional thyristor SCR1, the second bidirectional thyristor SCR2, the third bidirectional thyristor SCR3, the first switching device and the sixth switching device in open-state; meanwhile, make the first unidirectional thyristor SCR4 and the second unidirectional thyristor SCR5 in closed-state; at this time, the three-phase boost rectifier circuit works in the battery-operated mode.

Further, the commercial power supply mode comprising the following stages:

when the first phase's voltage of three-phase power is in the positive half cycle, make the first switching device in open-state; in the first stage, make the second switching device in closed-state; the first phase's voltage of three-phase power charges the first inductor L1 through a circuit consist of the first bidirectional thyristor SCR1, the first inductor L1, the second switching device and the second capacitor C2; in the second stage, make the second switching device in open-state; the first inductive discharge and the discharge current of the first inductive charge the first capacitor C1 through a circuit consist of the body diode of the first switching device, the first capacitor C1, the first bidirectional thyristor SCR1 and the first inductor L1;

when the first phase's voltage of three-phase power is in the negative half cycle, make the second switching device in open-state; in the third stage, make the first switching device in closed-state; the first phase's voltage of three-phase power charges the first inductor L1 through a circuit consist of the first bidirectional thyristor SCR1, the first inductor L1, the first switching device and the first capacitor C1; in the fourth stage, make the first switching device in open-state; the first inductive discharge and the discharge current of the first inductor L1 charge the second capacitor C2 through a circuit consist of the body diode of the second switching device, the second capacitor C2, the first bidirectional thyristor SCR1 and the first inductor L1;

when the second phase's voltage of three-phase power is in the positive half cycle, make the third switching device in open-state; in the first stage, make the fourth switching device in closed-state; the second phase's voltage of three-phase power charges the second inductor L2 through a circuit consist of the second bidirectional thyristor SCR2, the second inductor L2, the fourth switching device and the second capacitor C2; in the second stage, make the fourth switching device in open-state; the second inductive discharge and the discharge current of the second inductive charge the first capacitor C1 through a circuit consist of the body diode of the third switching device, the first capacitor C1, the second bidirectional thyristor SCR2 and the second inductor L2;

when the second phase's voltage of three-phase power is in the negative half cycle, make the fourth switching device in open-state; in the third stage, make the third switching device in closed-state; the second phase's voltage of three-phase power charges the second inductor L2 through a circuit consist of the second bidirectional thyristor SCR2, the second inductor L2, the third switching device and the first capacitor C1; in the fourth stage, make the third switching device in open-state; the second inductive discharge and the discharge current of the second inductor L2 charge the second capacitor C2 through a circuit consist of the body diode of the fourth switching device, the second capacitor C2, the second bidirectional thyristor SCR2 and the second inductor L2;

when the third phase's voltage of three-phase power is in the positive half cycle, make the fifth switching device in open-state; in the first stage, make the sixth switching device in closed-state; the third phase's voltage of three-phase power charges the third inductor L3 through a circuit consist of the third bidirectional thyristor SCR3, the third inductor L3, the sixth switching device and the second capacitor C2; in the second stage, make the sixth switching device in open-state; the third inductive discharge and the discharge current of the third inductive charge the first capacitor C1 through a circuit consist of the body diode of the fifth switching device, the first capacitor C1, the third bidirectional thyristor SCR3 and the third inductor L3;

when the third phase's voltage of three-phase power is in the negative half cycle, make the sixth switching device in open-state; in the third stage, make the fifth switching device in closed-stare; the third phase's voltage of three-phase power charges the third inductor L3 through a circuit consist of the third bidirectional thyristor SCR3, the second inductor L2, the fifth switching device and the first capacitor C1; in the fourth stage, make the third switching device in open-state; the third inductive discharge and the discharge current of the third inductor L3 charge the second capacitor C2 through a circuit consist of the body diode of the sixth switching device, the second capacitor C2, the third bidirectional thyristor SCR3 and the third inductor L3.

Further, the battery-operated mode comprising the following stages:

in the first stage, make the second switching device and the fifth switching device in closed-state; at this time, the first inductor L1 charges through a circuit consist of the first battery packs BAT+, the first unidirectional thyristor SCR4, the first inductor L1, the second switching device and the second capacitor C2; the third inductor L3 charges through a circuit consist of the second battery packs BAT−, the first capacitor C1, the fifth switching device, the third inductor L3 and the second unidirectional thyristor SCR5;

in the second stage, make the second switching device and the fifth switching device in open-state; at this time, the first inductor L1 discharges and the discharge current of the first inductor L1 charge the first capacitor C1 through a circuit consist of the body diode of the first switching device, the first capacitor C1, the first battery packs BAT+, the first unidirectional thyristor SCR4 and the first inductor L1; the third inductor L3 discharges and the discharge current of the third inductor L3 charge the second capacitor C2 through a circuit consist of the second unidirectional thyristor SCR5, the second battery packs BAT−, the second capacitor C2, the body diode of the sixth switching device and the third inductor L3.

Further, when the three-phase boost rectifier circuit works in the battery-operated mode, make the balanced bridge circuit which consist of the fourth bidirectional thyristor SCR6, the second inductor L2, the third switching device and the fourth switching device work, in order to keep the residual capacity of the first battery packs BAT+ as same as the residual capacity of the second battery packs BAT−, as well as maintain the load balance of the positive and negative DC bus.

Further, making the balanced bridge circuit which consist of the fourth bidirectional thyristor SCR6, the second inductor L2 the third switching device and the fourth switching device work comprising the following steps:

step one: make a real-time detection of the current value of the first battery packs BAT+, the current value of the second battery packs BAT−, the voltage value of the first battery packs BAT+ and the voltage value of the second battery packs BAT−;

step two: calculating the residual capacity of the first battery packs BAT+, the residual capacity of the second battery packs BAT− as well as the ratio K of the residual capacity of the first battery packs BAT+ and the residual capacity of the second battery packs BAT−, where $K \geqslant 0$;

Step three: make the fourth bidirectional thyristor SCR6, the third switching device and the fourth switching device work according to the value of K.

Further, the step three, in details:

when $0 \leqslant K<1$, make the fourth bidirectional thyristor SCR6 in closed-state while the third switching device in open-state; in the first stage, make the fourth switching device in closed-state, meanwhile the second inductor L2 charges through a circuit consist of the fourth switching device, the second capacitor C2, the fourth bidirectional thyristor SCR6 and the second inductor L2; in the second stage, make the fourth switching device in open-state, meanwhile the first capacitor C1 charges through a circuit consist of the first capacitor C1, the fourth bidirectional thyristor SCR6, the second inductor L2 and the body diode of the third switching device;

when K=1, make the fourth bidirectional thyristor SCR6, the third switching device and the fourth switching device in open-state;

when K>1, make the fourth bidirectional thyristor SCR6 in closed-state while the fourth switching device in open-state; in the first stage, make the third switching device in closed-state, meanwhile the second inductor L2 charges through a circuit consist of the first capacitor C1, the third switching device, the second inductor L2 and the forth bidirectional thyristor SCR6; in the second stage, make the third switching device in open-state, meanwhile the second capacitor C2 charges through circuit consist of the body diode of the fourth switching device, the second inductor L2, the fourth bidirectional thyristor SCR6 and the second capacitor C2.

In particular, the invention also provides an uninterrupted power supply based on the three-phase boost rectifier circuit, comprising the three-phase boost rectifier circuit and a inverter module, the inputs of the inverter module are connected with the outputs of the three-phase boost rectifier circuit.

Compared with existing technologies, the invention has the following advantages:

1. The boost rectifier circuit that proposed by the invention can share the power devices such as inductor, switching device, etc. The invention achieves different functions in different conditions by sharing the devices of the topology, which realizes the reuse of power level device, reduces the number of devices, improves the power density of the circuit as well as reduces the cost of the circuit.

2. The boost rectifier circuit that proposed by the invention use dual battery packs, which means that battery packs can be shared between different devices. The invention reduces the battery configuration as well as enlarge the scope of application.

3. The boost rectifier circuit that proposed by the invention can realize the positive and negative bus's independent boosting, also can maintain the balance of the positive and negative bus's voltage without the extra balance device. The invention allows the positive and negative bus bar to carry unbalanced load, which improves the reliability of the battery mode as well as reduces the cost.

4. The boost rectifier circuit that proposed by the invention works in half bridge mode under commercial power supply. The input voltage and current can be operated in four phase, the rectifier also has the ability to boost and feedback, which enlarges the scope of application of the equipment.

5. The invention achieves balance function by adding a fourth bidirectional thyristor SCR6, sharing the second inductor L2, the third switching transistors Q3 and the fourth switching transistors Q4 of the rectifier boost topology. On the one hand, the invention can ensure the remaining capacity of the first battery packs BAT+ and the second battery packs BAT− are consistent. On the other hand, the invention can ensure the load balance on the positive and negative DC bus by controlling the balance bridge.

DETAILED DESCRIPTION OF THE INVENTION

To allow the above features and advantages of this invention become more fully understood, especially cite the example below, and with the accompanying drawings, described in detail below, but the invention is not limited to this.

Embodiment 1

Figure 1:
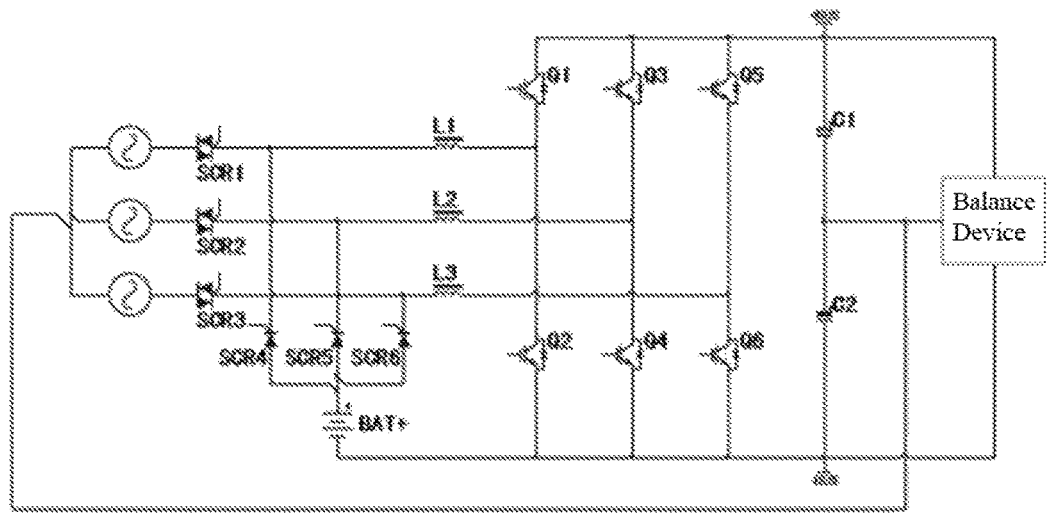
FIG. 1 shows the three-phase bridge type two-level rectifier boost topology that use single battery pack in the conventional technology.
Figure 2:
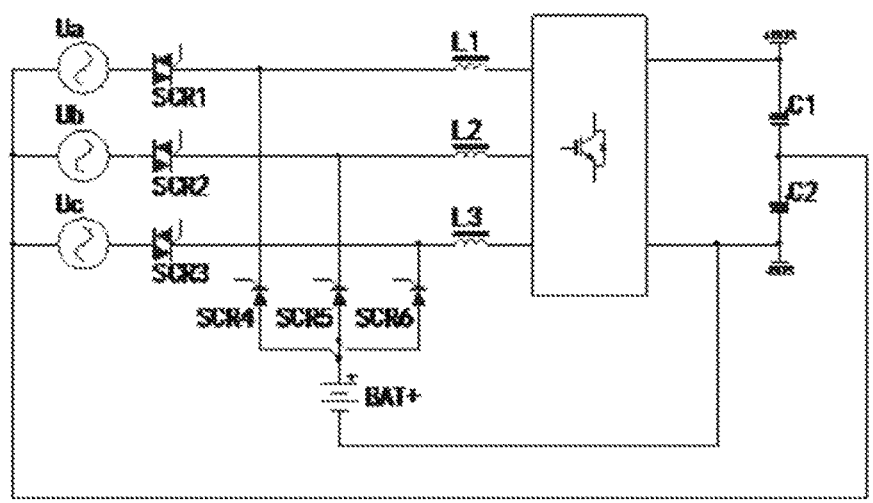
FIG. 2 shows the three-phase bridge rectifier boost topology in that use single battery pack in the conventional technology.
Figure 3:
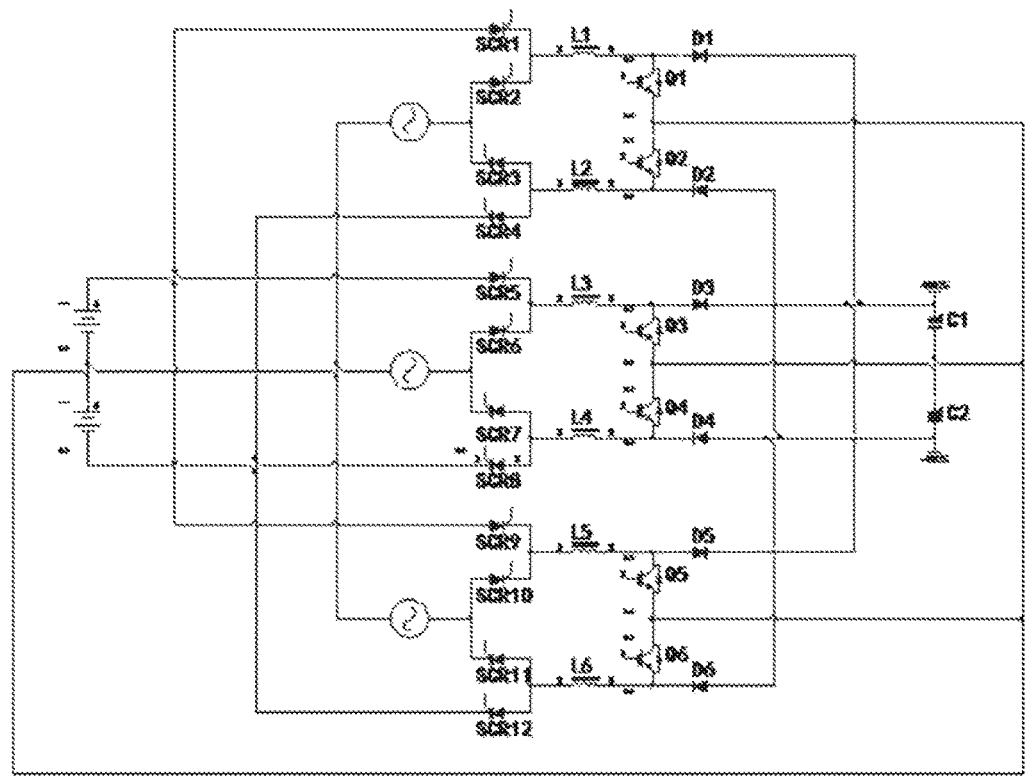
FIG. 3 shows the three-phase positive and negative double boost rectifier boost topology that use dual battery pack in the conventional technology.
Figure 4:
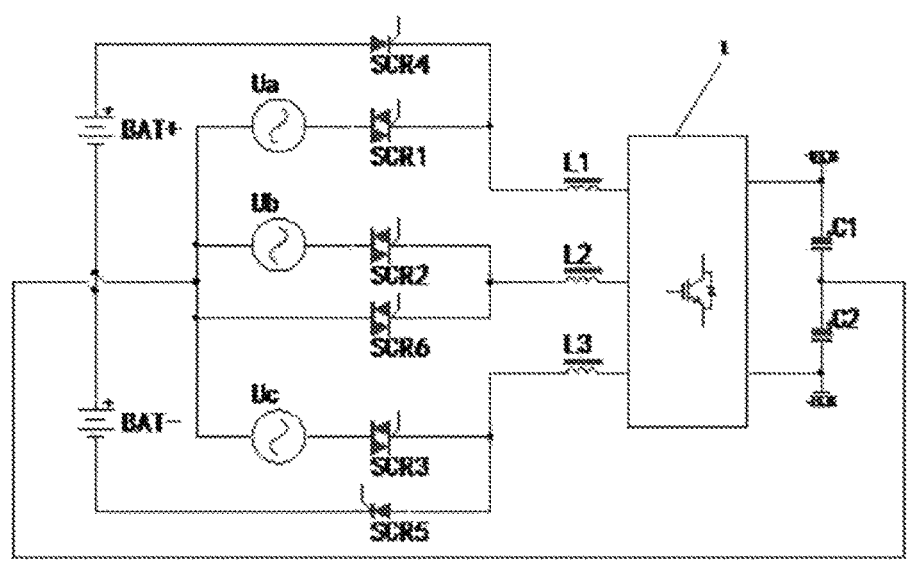
FIG. 4 shows the three-phase boost rectifier circuit in this invention.

As shown in FIG. 4, a three-phase boost rectifier circuit, comprising positive battery packs BAT+, second battery packs BAT−, and a boost rectifier module; the boost rectifier module comprising a first bidirectional thyristor SCR1, a second bidirectional thyristor SCR2, a third bidirectional thyristor SCR3, a fourth bidirectional thyristor SCR6, a first unidirectional thyristor SCR4, a second unidirectional thyristor SCR5, a first inductor L1, a second inductor L2, a third inductor L3, a three-phase fully controlled rectifier bridge, a first capacitor C1, a second capacitor C2; one end of the first bidirectional thyristor SCR1, one end of the second bidirectional thyristor SCR2 and one end of the third bidirectional thyristor SCR3 are respectively connected to the first phase of three-phase power, the second phase of three-phase power and the third phase of three-phase power; the anode of the first unidirectional thyristor SCR4 and the cathode of the second unidirectional thyristor SCR5 are respectively connected to the positive end of the first battery packs BAT+ and the negative end of the second battery packs BAT−; the negative end of the first battery packs BAT+, the positive end of the second battery packs BAT− and one end of the fourth bidirectional thyristor SCR6 are connected to the zero line of three-phase power; the cathode of the first unidirectional thyristor SCR4 and the other end of the first bidirectional thyristor SCR1 are both connected to the one end of the first inductor L1; the other end of the second bidirectional thyristor SCR2 and the other end of the fourth bidirectional thyristor SCR6 are both connected to the one end of the second inductor L2; the other end of the third bidirectional thyristor SCR3 and the anode of the second unidirectional thyristor SCR5 are both connected to the one end of the third inductor L3; the other end of the first inductor L1, the other end of the second inductor L2 and the other end of the third inductor L3 are respectively connected to the three-phase inputs of the three-phase fully controlled rectifier bridge; the two outputs of the three-phase fully controlled rectifier bridge are respectively connected to one end of the first capacitor C1 and one end of the second capacitor C2; the other end of the first capacitor C1 and the other end of the second capacitor C2 are both connected to the zero line of three-phase power.

Figure 5:
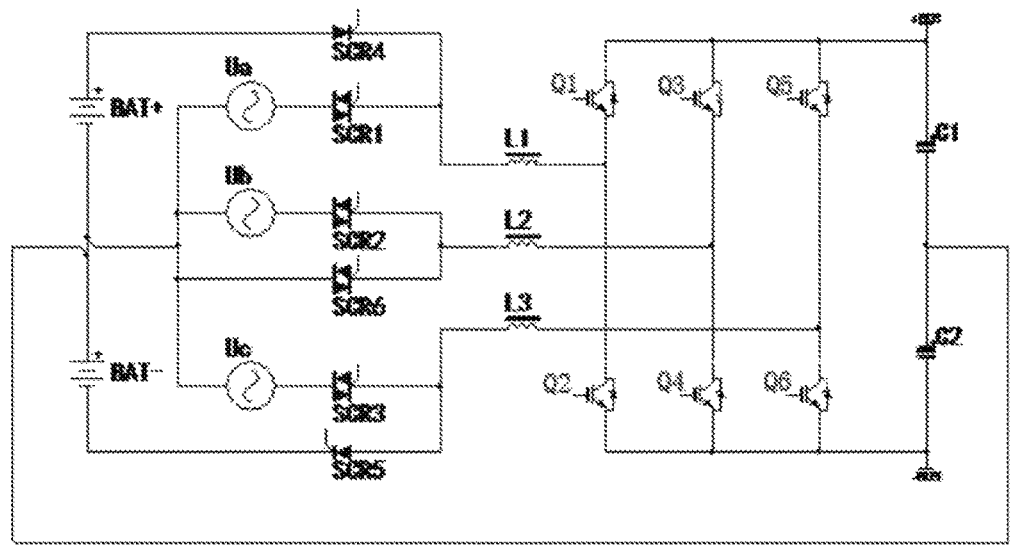
FIG. 5 shows the two-level power supplied three-phase bridge topology that with dual battery packs in embodiment 1.

In this embodiment, as shown in FIG. 5, the three-phase fully controlled rectifier bridge is two-level power supplied three-phase bridge topology, which comprising a first switching transistor Q1 and its body diode D1, a second switching transistor Q2 and its body diode D2, a third switching transistor Q3 and its body diode D3, a fourth switching transistor Q4 and its body diode D4, a fifth switching transistor Q5 and its body diode D5, a sixth switching transistor Q6 and its body diode D6; the collector of the first switching transistor Q1, the third switching transistor Q3 and the fifth switching transistor Q5 are connected as the first output of the three-phase fully controlled rectifier bridge; the transmitter of the second switching transistor Q2, the fourth switching transistor Q4 and the sixth switching transistor Q6 are connected as the second output of the three-phase fully controlled rectifier bridge; the transmitter of the first switching transistor Q1 is connected with the collector of the second switching transistor Q2 as the first phase input of the three-phase fully controlled rectifier bridge; the transmitter of the third switching transistor Q3 is connected with the collector of the fourth switching transistor Q4 as the second phase input of the three-phase fully controlled rectifier bridge; the transmitter of the fifth switching transistor Q5 is connected with the collector of the sixth switching transistor Q6 as the third phase input of the three-phase fully controlled rectifier bridge.

Figure 6:
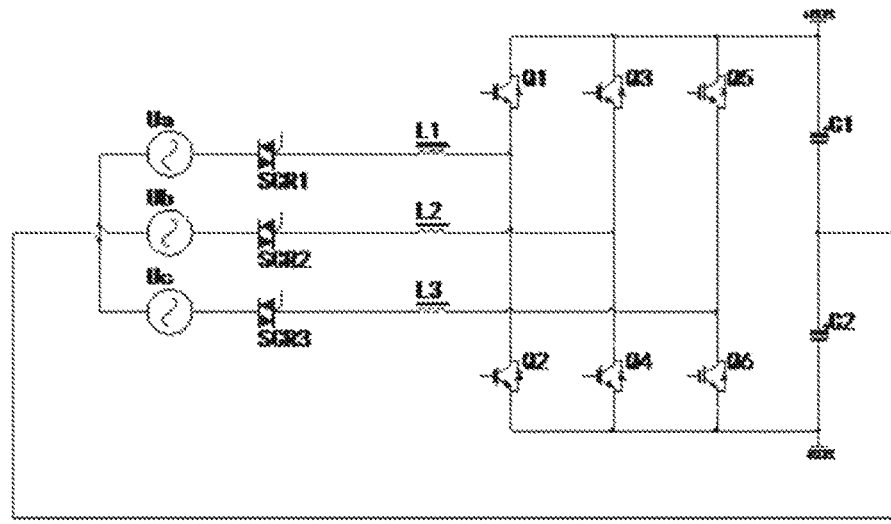
FIG. 6 shows the sketch of the three-phase boost rectifier circuit that works in commercial power supply mode in embodiment 1.

In this embodiment, as shown in FIG. 6, the first bidirectional thyristor SCR1, the second bidirectional thyristor SCR2, the third bidirectional thyristor SCR3 the first inductor L1, the second inductor L2, the third inductor L3, the first switching transistor Q1, the second switching transistor Q2, the third switching transistor Q3, the fourth switching transistor Q4, the fifth switching transistor Q5, the sixth switching transistor Q6, the first capacitor C1 and the second capacitor C2 forming a rectifier boost power stage circuit under commercial power supply mode;

The first battery packs BAT+, the second battery packs BAT−, the first unidirectional thyristor SCR4, the second unidirectional thyristor SCR?, the first inductor L1, the third inductor L3, the first switching transistor Q1, the second switching transistor Q2, the fifth switching transistor Q5, the sixth switching transistor Q6, the first capacitor C1 and the second capacitor C2 forming a rectifier boost power stage circuit under battery-operated mode.

This embodiment also provides a control method of the three-phase boost rectifier circuit which is recorded above:

when the commercial power supply is normal, make the first bidirectional thyristor SCR1, the second bidirectional thyristor SCR2 and the third bidirectional thyristor SCR3 in closed-state; meanwhile, make the first unidirectional thyristor SCR4, the second unidirectional thyristor SCR5, the fourth bidirectional thyristor SCR in open-state; at this time, the three-phase boost rectifier circuit works in the commercial power supply mode;

when the commercial power supply is abnormal, make the first bidirectional thyristor SCR, the second bidirectional thyristor SCR2, the third bidirectional thyristor SCR3, the first switching transistor Q1 and the sixth switching transistor Q6 in open-state; meanwhile, make the first unidirectional thyristor SCR4 and the second unidirectional thyristor SCR5 in closed-state; at this time, the three-phase boost rectifier circuit works in the battery-operated mode.

Figure 7:
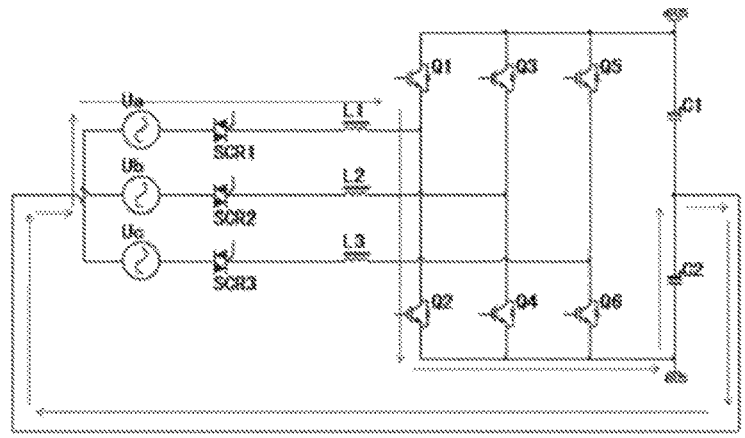
FIG. 7 shows the working principle diagram in which the first phase voltage is in positive half cycle and in the first stage of the rectifying and boosting.
Figure 8:
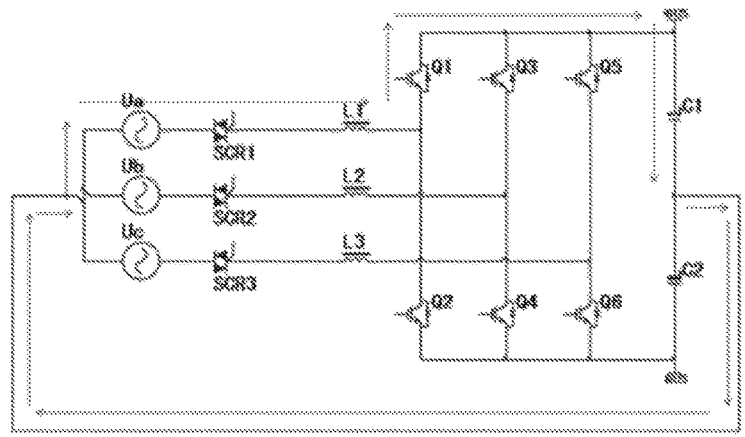
FIG. 8 shows the working principle diagram in which the first phase voltage is in positive half cycle and in the second stage of the rectifying and boosting.
Figure 9:
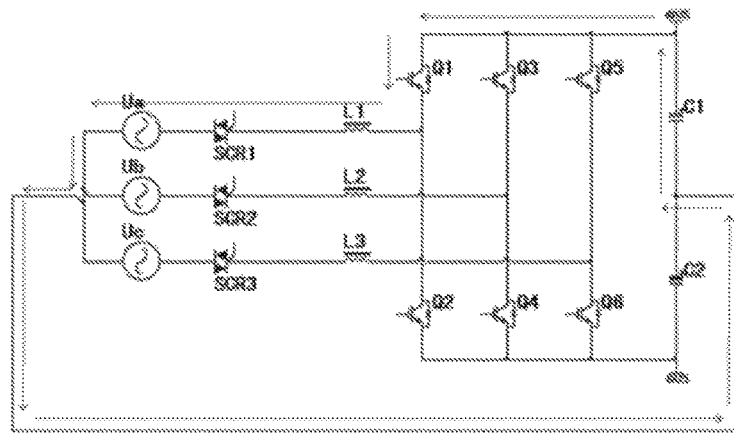
FIG. 9 shows the working principle diagram in which the first phase voltage is in negative half cycle and in the third stage of the rectifying and boosting.
Figure 10:
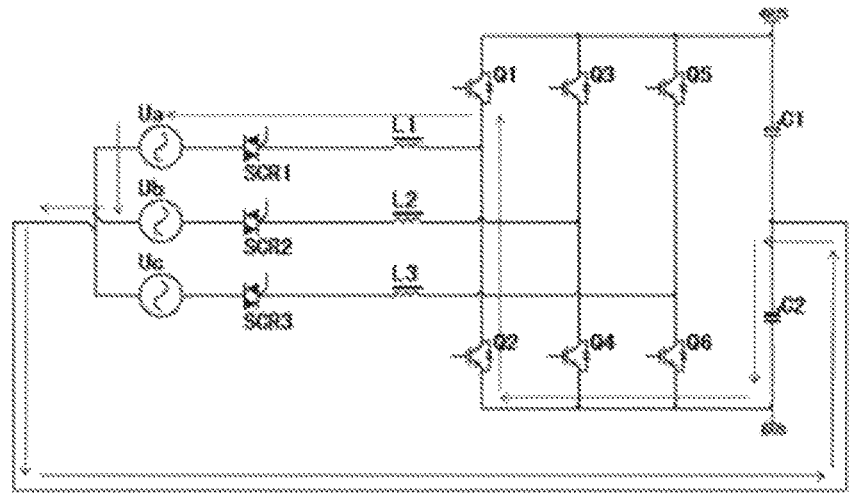
FIG. 10 shows the working principle diagram in which the first phase voltage is in negative half cycle and in the fourth stage of the rectifying and boosting.

In this embodiment, the commercial power supply mode comprising the following stages:

when the first phase's voltage of three-phase power is in the positive half cycle, make the first switching transistor Q1 in open-state; in the first stage, as shown in FIG. 7, make the second switching transistor Q2 in closed-state; the first phase's voltage of three-phase power charges the first inductor L1 through a circuit consist of the first bidirectional thyristor SCR1, the first inductor L1, the second switching transistor Q2 and the second capacitor C2; in the second stage, as shown in FIG. 8, make the second switching transistor Q2 in open-state; the first inductive L1 discharge and the discharge current of the first inductive L1 charge the first capacitor C1 through a circuit consist of the body diode of the first switching transistor Q1, the first capacitor C1, the first bidirectional thyristor SCR1 and the first inductor L1;

when the first phase's voltage of three-phase power is in the negative half cycle, make the second switching transistor Q2 in open-state; in the third stage, as shown in FIG. 9, make the first switching transistor Q1 in closed-state; the first phase's voltage of three-phase power charges the first inductor L1 through a circuit consist of the first bidirectional thyristor SCR1, the first inductor L1, the first switching transistor Q1 and the first capacitor C1; in the fourth stage, as shown in FIG. 10, make the first switching transistor Q1 in open-state; the first inductive L1 discharge and the discharge current of the first inductor L1 charge the second capacitor C2 through a circuit consist of the body diode of the second switching transistor Q2, the second capacitor C2 the first bidirectional thyristor SCR1 and the first inductor L1;

when the second phase's voltage of three-phase power is in the positive half cycle, make the third switching transistor Q3 in open-state; in the first stage, make the fourth switching transistor Q4 in closed-state; the second phase's voltage of three-phase power charges the second inductor L2 through a circuit consist of the second bidirectional thyristor SCR2, the second inductor L2, the fourth switching transistor Q4 and the second capacitor C2; in the second stage, make the fourth switching transistor Q4 in open-state; the second inductive L2 discharge and the discharge current of the second inductive charge the first capacitor C1 through a circuit consist of the body diode of the third switching transistor Q3, the first capacitor C1, the second bidirectional thyristor SCR2 and the second inductor L2;

when the second phase's voltage of three-phase power is in the negative half cycle, make the fourth switching transistor Q4 in open-state; in the third stage, make the third switching transistor Q3 in closed-state; the second phase's voltage of three-phase power charges the second inductor L2 through a circuit consist of the second bidirectional thyristor SCR2, the second inductor L2, the third switching transistor Q3 and the first capacitor C1; in the fourth stage, make the third switching transistor Q3 in open-state; the second inductive L2 discharge and the discharge current of the second inductor L2 charge the second capacitor C2 through a circuit consist of the body diode of the fourth switching transistor Q4, the second capacitor C2, the second bidirectional thyristor SCR2 and the second inductor L2;

when the third phase's voltage of three-phase power is in the positive half cycle, make the fifth switching transistor Q5 in open-state; in the first stage, make the sixth switching transistor Q6 in closed-state; the third phase's voltage of three-phase power charges the third inductor L3 through a circuit consist of the third bidirectional thyristor SCR3, the third inductor L3, the sixth switching transistor Q6 and the second capacitor C2; in the second stage, make the sixth switching transistor Q6 in open-state; the third inductive L3 discharge and the discharge current of the third inductive charge the first capacitor C1 through a circuit consist of the body diode of the fifth switching transistor Q5, the first capacitor C1, the third bidirectional thyristor SCR3 and the third inductor L3;

when the third phase's voltage of three-phase power is in the negative half cycle, make the sixth switching transistor Q6 in open-state; in the third stage, make the fifth switching transistor Q5 in closed-state; the third phase's voltage of three-phase power charges the third inductor L3 through a circuit consist of the third bidirectional thyristor SCR3, the second inductor L2, the fifth switching transistor Q5 and the first capacitor C1; in the fourth stage, make the third switching transistor Q3 in open-state; the third inductive L3 discharge and the discharge current of the third inductor L3 charge the second capacitor C2 through a circuit consist of the body diode of the sixth switching transistor Q6, the second capacitor C2, the third bidirectional thyristor SCR3 and the third inductor L3.

Figure 11:
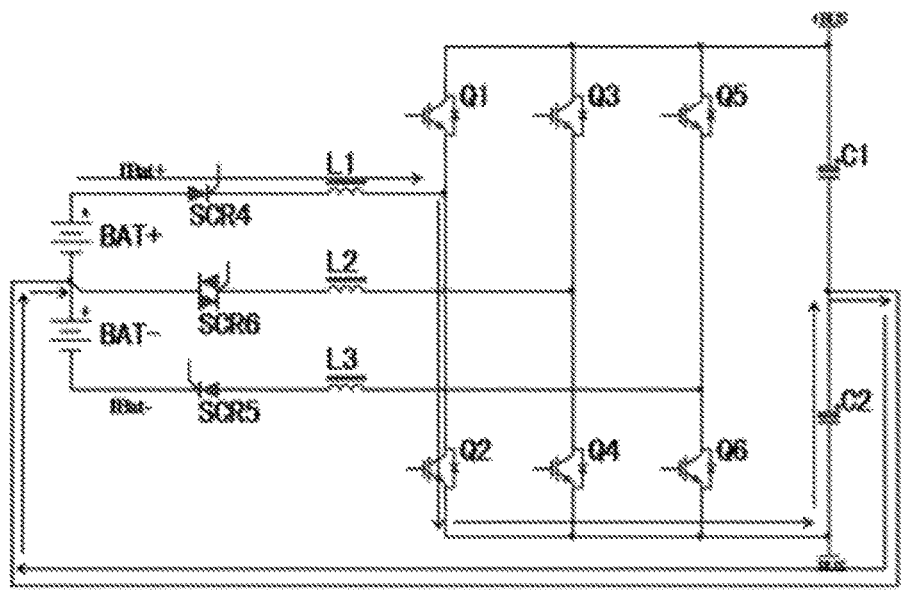
FIG. 11 shows the working principle diagram of the first stage of the rectifying and boosting by first battery packs BAT+ under battery-operated mode.
Figure 12:
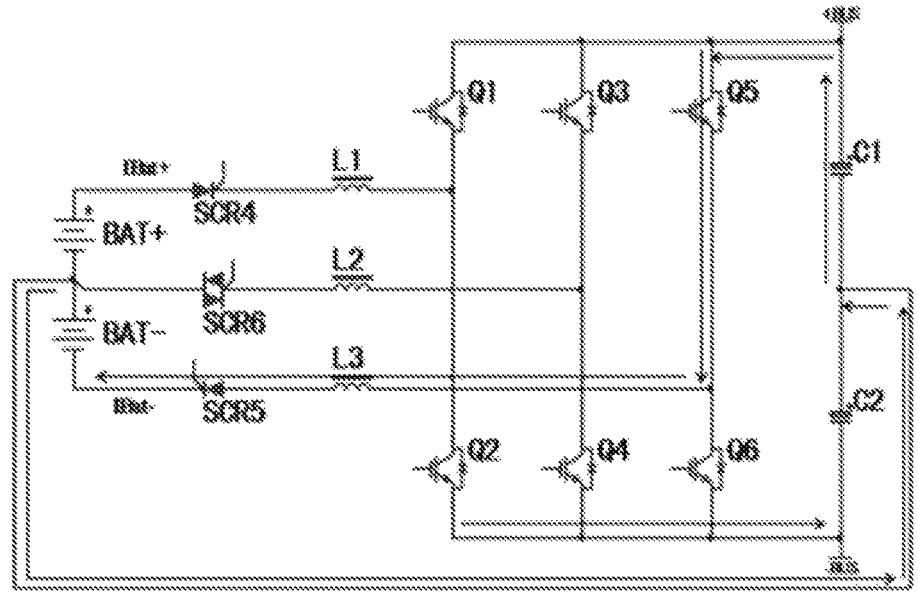
FIG. 12 shows the working principle diagram of the first stage of the rectifying and boosting by first battery packs BAT− under battery-operated mode.
Figure 13:
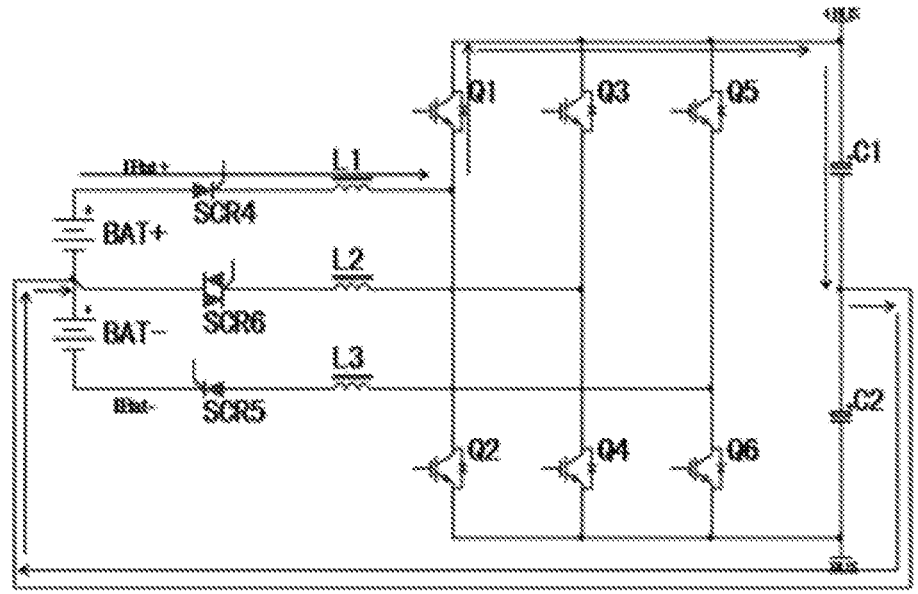
FIG. 13 shows the working principle diagram of the second stage of the rectifying and boosting by first battery packs BAT+ under battery-operated mode.
Figure 14:
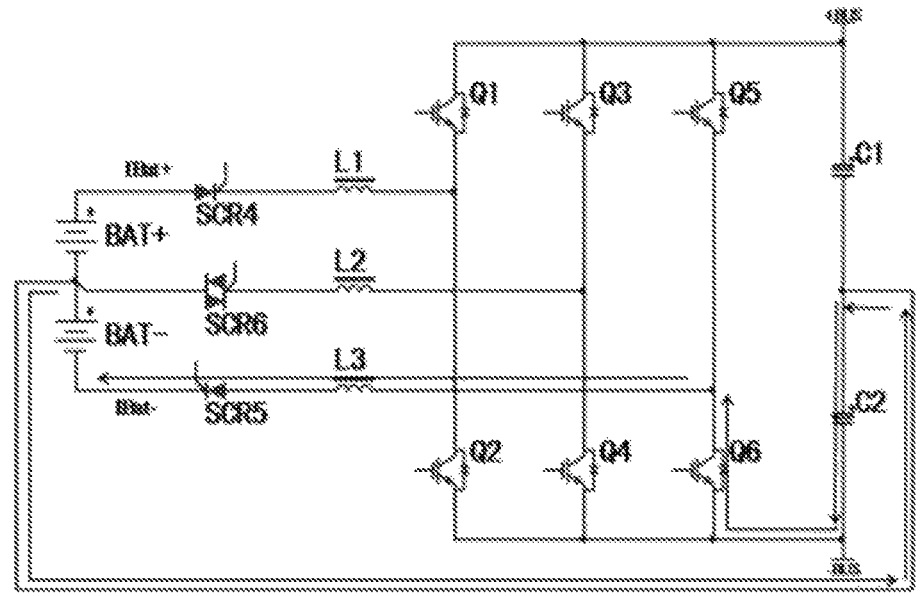
FIG. 14 shows the working principle diagram of the second stage of the rectifying and boosting by first battery packs BAT− under battery-operated mode.

In this embodiment, the battery-operated mode comprising the following stages:

In the first stage, make the second switching transistor Q2 and the fifth switching transistor Q5 in closed-state; as shown in FIG. 11, at this time, the first inductor L1 charges through a circuit consist of the first battery packs BAT+, the first unidirectional thyristor SCR4, the first inductor L1, the second switching transistor Q2 and the second capacitor C2; as shown in FIG. 12, the third inductor L3 charges through a circuit consist of the second battery packs BAT−, the first capacitor C1, the fifth switching transistor Q5, the third inductor L3 and the second unidirectional thyristor SCR5;

In the second stage, make the second switching transistor Q2 and the fifth switching transistor Q5 in open-state; as shown in FIG. 13, at this time, the first inductor L1 discharges and the discharge current of the first inductor L1 charge the first capacitor C1 through a circuit consist of the body diode of the first switching transistor Q1, the first capacitor C1, the first battery packs BAT+, the first unidirectional thyristor SCR4 and the first inductor L1; as shown in FIG. 14, the third inductor L3 discharges and the discharge current of the third inductor L3 charge the second capacitor C2 through a circuit consist of the second unidirectional thyristor SCR5, the second battery packs BAT−, the second capacitor C2, the body diode of the sixth switching transistor Q6 and the third inductor L3.

Especially, when the three-phase boost rectifier circuit works in the battery-operated mode, make the balanced bridge circuit which consist of the fourth bidirectional thyristor SCR6, the second inductor L2, the third switching transistor Q3 and the fourth switching transistor Q4 work, in order to keep the residual capacity of the first battery packs BAT+ as same as the residual capacity of the second battery packs BAT−, as well as maintain the load balance of the positive and negative DC bus.

Further, making the balanced bridge circuit which consist of the fourth bidirectional thyristor SCR6, the second inductor L2, the third switching transistor Q3 and the fourth switching transistor Q4 work comprising the following steps:

Step one: make a real-time detection of the current value of the first battery packs BAT+, the current value of the second battery packs BAT−, the voltage value of the first battery packs UBAT+ and the voltage value of the second battery packs UBAT−;

Step two: calculating the residual capacity of the first battery packs QBAT+, the residual capacity of the second battery packs QBAT− as well as the ratio K of the residual capacity of the first battery packs BAT+ and the residual capacity of the second battery packs BAT−, where K $\geqslant$ 0;

Step three: make the fourth bidirectional thyristor SCR6, the third switching transistor Q3 and the fourth switching transistor Q4 work according to the value of K.

Figure 15:
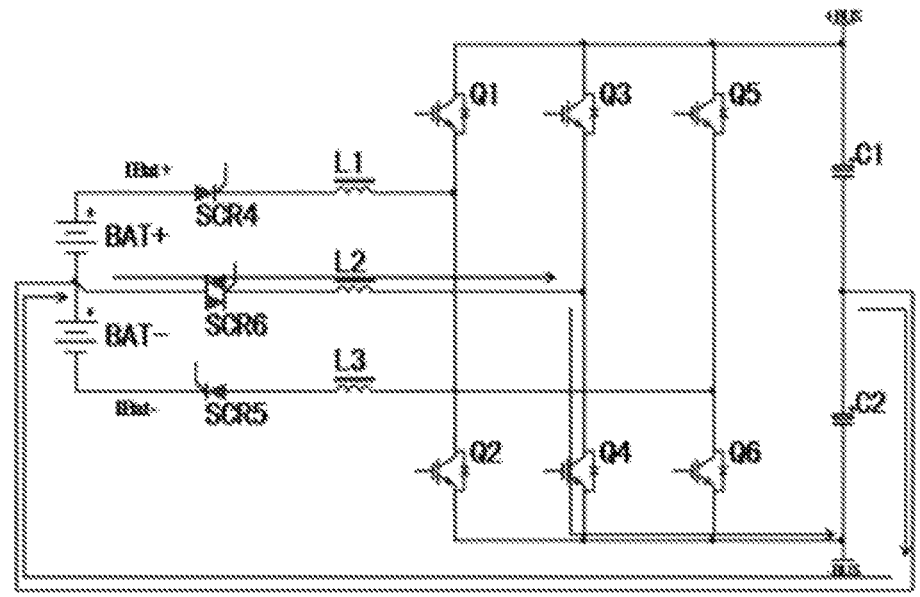
FIG. 15 shows the working principle diagram of the first stage of the balanced bridge when $0 \leq K<1$.
Figure 16:
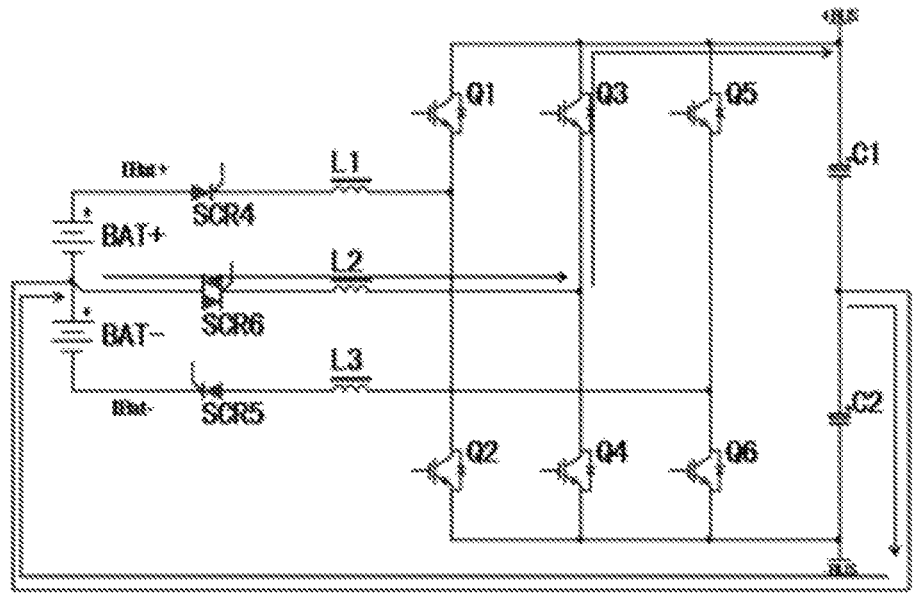
FIG. 16 shows the working principle diagram of the second stage of the balanced bridge when $0 \leq K<1$.
Figure 17:
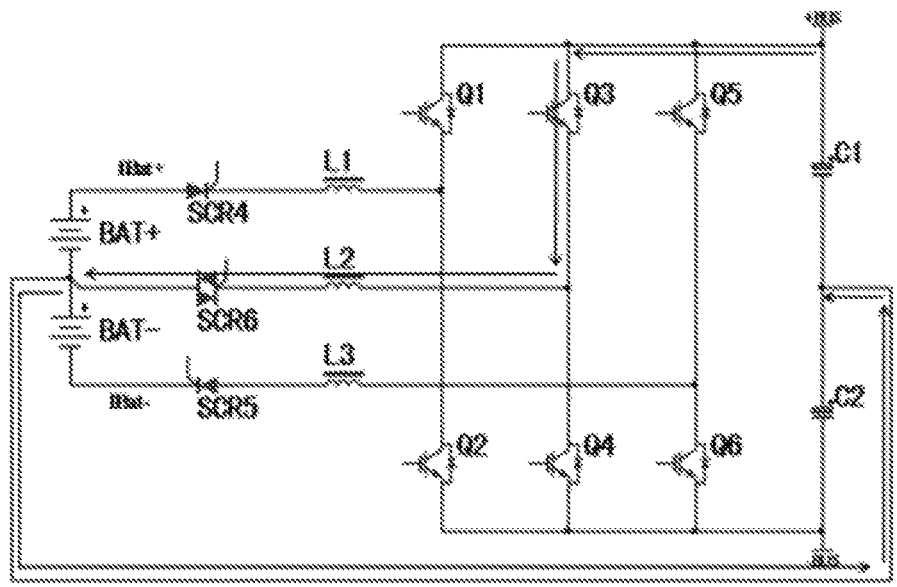
FIG. 17 shows the working principle diagram of the first stage of the balanced bridge when $K>1$.
Figure 18:
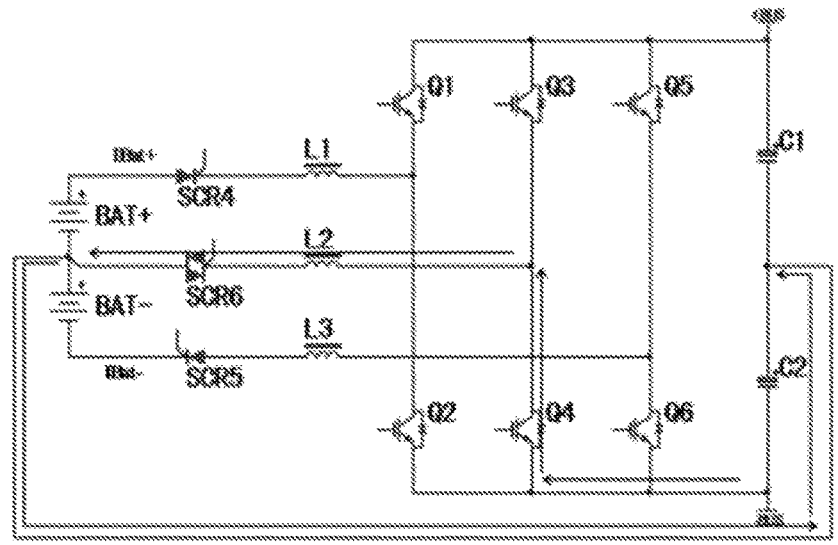
FIG. 18 shows the working principle diagram of the second stage of the balanced bridge when $K>1$.

In this embodiment, the step three, in details:

when $0 \leqslant K < 1$, make the fourth bidirectional thyristor SCR6 in closed-state while the third switching transistor Q3 in open-state; as shown in FIG. 15, in the first stage, make the fourth switching transistor Q4 in closed-state, meanwhile the second inductor L2 charges through a circuit consist of the fourth switching transistor Q4, the second capacitor C2, the fourth bidirectional thyristor SCR and the second inductor L2; in the second stage, as shown in FIG. 16, make the fourth switching transistor Q4 in open-state, meanwhile the first capacitor C1 charges through a circuit consist of the first capacitor C1, the fourth bidirectional thyristor SCR6, the second inductor L2 and the body diode of the third switching transistor Q3;

when K=1, make the fourth bidirectional thyristor SCR6, the third switching transistor Q3 and the fourth switching transistor Q4 in open-state;

when K>1, make the fourth bidirectional thyristor SCR6 in closed-state while the fourth switching transistor Q4 in open-state; in the first stage, as shown in FIG. 17, make the third switching transistor Q3 in closed-state, meanwhile the second inductor L2 charges through a circuit consist of the first capacitor C1, the third switching transistor Q3, the second inductor L2 and the fourth bidirectional thyristor SCR6; in the second stage, as shown in FIG. 18, make the third switching transistor Q3 in open-state, meanwhile the second capacitor C2 charges through a circuit consist of the body diode of the fourth switching transistor Q4, the second inductor L2, the fourth bidirectional thyristor SCR6 and the second capacitor C2.

Embodiment 2

Figure 19:
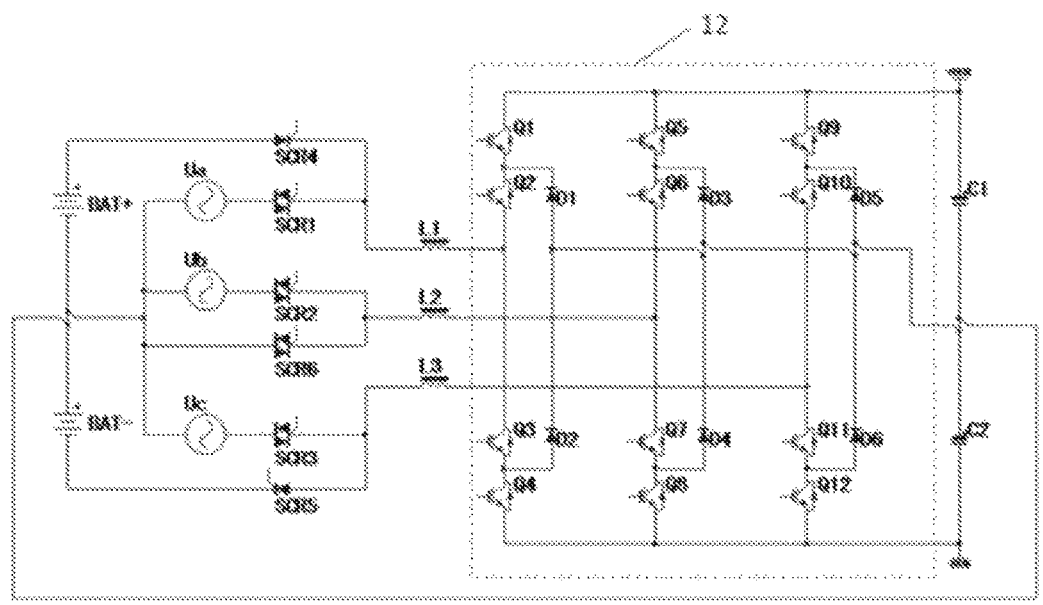
FIG. 19 shows the three-level power supplied three-phase half bridge topology which is I-type three-level inverting topology unit that with dual battery packs in embodiment 2.

As shown in FIG. 19, this embodiment provide a three-phase boost rectifier circuit, comprising positive battery packs BAT+, second battery packs BAT−, and a boost rectifier module; the boost rectifier module comprising a first bidirectional thyristor SCR1, a second bidirectional thyristor SCR2, a third bidirectional thyristor SCR3, a fourth bidirectional thyristor SCR6, a first unidirectional thyristor SCR4, a second unidirectional thyristor SCR5, a first inductor L1, a second inductor L2, a third inductor L3, a three-phase fully controlled rectifier bridge, a first capacitor C1, a second capacitor C2; one end of the first bidirectional thyristor SCR1, one end of the second bidirectional thyristor SCR2 and one end of the third bidirectional thyristor SCR3 are respectively connected to the first phase of three-phase power, the second phase of three-phase power and the third phase of three-phase power; the anode of the first unidirectional thyristor SCR4 and the cathode of the second unidirectional thyristor SCR5 are respectively connected to the positive end of the first battery packs BAT+ and the negative end of the second battery packs BAT−; the negative end of the first battery packs BAT+, the positive end of the second battery packs BAT− and one end of the fourth bidirectional thyristor SCR6 are connected to the zero line of three-phase power; the cathode of the first unidirectional thyristor SCR4 and the other end of the first bidirectional thyristor SCR1 are both connected to the one end of the first inductor L1; the other end of the second bidirectional thyristor SCR2 and the other end of the fourth bidirectional thyristor SCR6 are both connected to the one end of the second inductor L2; the other end of the third bidirectional thyristor SCR3 and the anode of the second unidirectional thyristor SCR5 are both connected to the one end of the third inductor L3; the other end of the first inductor L1, the other end of the second inductor L2 and the other end of the third inductor L3 are respectively connected to the three-phase inputs of the three-phase fully controlled rectifier bridge; the two outputs of the three-phase fully controlled rectifier bridge are respectively connected to one end of the first capacitor C1 and one end of the second capacitor C2; the other end of the first capacitor C1 and the other end of the second capacitor C2 are both connected to the zero line of three-phase power.

In this embodiment the three-phase fully controlled rectifier bridge is three-level power supplied three-phase half bridge topology which is I-type three-level inverting topology unit. The three-level power supplied three-phase half bridge topology which is I-type three-level inverting topology unit comprising first switching device Q1 to twelfth switching device Q12 and first diode D1 to sixth diode D6; the transmitter or source of the first switching device Q1 and the collector or drain of the second switching device Q2 are both connected to the cathode of the first diode D1; the transmitter or source of the fifth switching device Q5 and the collector or drain of the sixth switching device Q6 are both connected to the cathode of the third diode D3; the transmitter or source of the ninth switching device Q9 and the collector or drain of the tenth switching device Q10 are both connected to the cathode of the fifth diode D5; the transmitter or source of the third switching device Q3 and the collector or drain of the fourth switching device Q4 are both connected to the anode of the second diode D2; the transmitter or source of the seventh switching device Q7 and the collector or drain of the eighth switching device Q8 are both connected to the anode of the fourth diode D4; the transmitter or source of the eleventh switching device Q11 and the collector or drain of the twelfth switching device Q12 are both connected to the anode of the sixth diode D6; the anode of the first diode D1 is connected with the cathode of the second diode D2; the anode of the third diode D3 is connected with the cathode of the fourth diode D4; the anode of the fifth diode D5 is connected with the cathode of the sixth diode D6; the collector or drain of the first switching device Q1, the collector or drain of the fifth switching device Q5 and the collector or drain of the ninth switching device Q9 are connected as the first output of the three-phase fully controlled rectifier bridge; the transmitter or source of the fourth switching device Q4, the transmitter or source of the eighth switching device Q8 and the transmitter or source of the twelfth switching device Q12 are connected as the second output of the three-phase fully controlled rectifier bridge; the transmitter or source of the second switching device Q2 and the collector or drain of the third switching device Q3 are connected as the first phase input of the three-phase fully controlled rectifier bridge; the transmitter or source of the sixth switching device Q6 and the collector or drain of the seventh switching device Q7 are connected as the second phase input of the three-phase fully controlled rectifier bridge; the transmitter or source of the tenth switching device Q10 and the collector or drain of the eleventh switching device Q11 are connected as the third phase input of the three-phase fully controlled rectifier bridge; the anode of the first diode, the anode of the second diode D2 and the anode of the third diode D3 are connected to the zero line of three-phase power.

Embodiment 3

Figure 20:
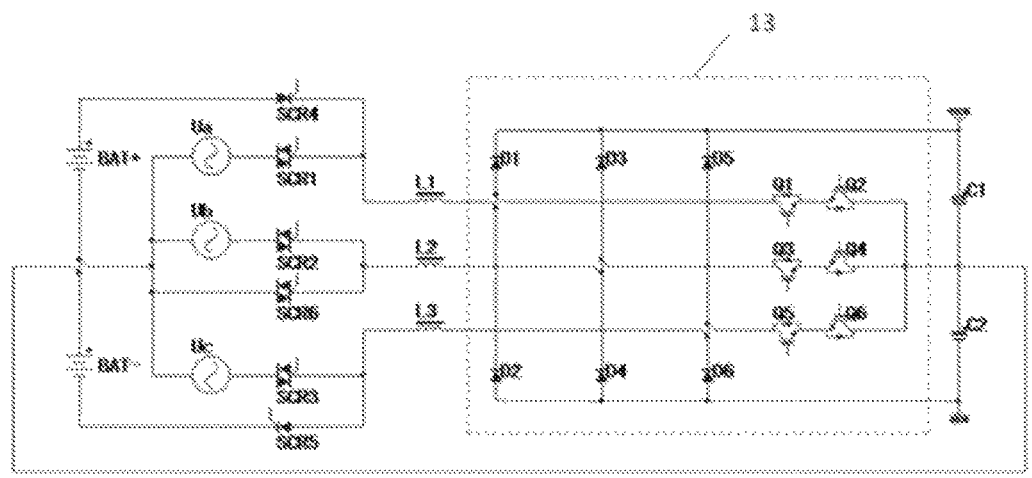
FIG. 20 shows the three-level power supplied three-phase half bridge topology which is T-type three-level inverting topology, unit that with dual battery packs in embodiment 3.

As shown in FIG. 20, this embodiment provide a three-phase boost rectifier circuit, comprising positive battery packs BAT+, second battery packs BAT−, and a boost rectifier module; the boost rectifier module comprising a first bidirectional thyristor SCR1, a second bidirectional thyristor SCR2, a third bidirectional thyristor SCR3, a fourth bidirectional thyristor SCR6, a first unidirectional thyristor SCR4, a second unidirectional thyristor SCR5, a first inductor L1, a second inductor L2, a third inductor L3, a three-phase fully controlled rectifier bridge, a first capacitor C1, a second capacitor C2; one end of the first bidirectional thyristor SCR1, one end of the second bidirectional thyristor SCR2 and one end of the third bidirectional thyristor SCR3 are respectively connected to the first phase of three-phase power, the second phase of three-phase power and the third phase of three-phase power; the anode of the first unidirectional thyristor SCR4 and the cathode of the second unidirectional thyristor SCR5 are respectively connected to the positive end of the first battery packs BAT+ and the negative end of the second battery packs BAT−; the negative end of the first battery packs BAT+, the positive end of the second battery packs BAT− and one end of the fourth bidirectional thyristor SCR6 are connected to the zero line of three-phase power; the cathode of the first unidirectional thyristor SCR4 and the other end of the first bidirectional thyristor SCR1 are both connected to the one end of the first inductor L1; the other end of the second bidirectional thyristor SCR2 and the other end of the fourth bidirectional thyristor SCR6 are both connected to the one end of the second inductor L2; the other end of the third bidirectional thyristor SCR3 and the anode of the second unidirectional thyristor SCR5 are both connected to the one end of the third inductor L3; the other end of the first inductor L1, the other end of the second inductor L2 and the other end of the third inductor L3 are respectively connected to the three-phase inputs of the three-phase fully controlled rectifier bridge; the two outputs of the three-phase fully controlled rectifier bridge are respectively connected to one end of the first capacitor C1 and one end of the second capacitor C2; the other end of the first capacitor C1 and the other end of the second capacitor C2 are both connected to the zero line of three-phase power.

In this embodiment, the three-phase fully controlled rectifier bridge is three-level power supplied three-phase half bridge topology which is T-type three-level inverting topology unit. The three-level power supplied three-phase half bridge topology which is T-type three-level inverting topology unit comprising first switching device to sixth switching device and first diode to sixth diode; the transmitter or source of the first switching device Q1 is connected with the transmitter or source of the second switching device Q2, the transmitter or source of the third switching device Q3 is connected with the transmitter or source of the fourth switching device Q4, the transmitter or source of the fifth switching device Q5 is connected with the transmitter or source of the sixth switching device Q6; the cathode of the first diode D1, the cathode of the third diode D3 and the cathode of the fifth diode D5 are connected as the first output of the three-phase fully controlled rectifier bridge; the anode of the second diode D2, the anode of the fourth diode D4 and the anode of the sixth diode D6 are connected as the second output of the three-phase fully controlled rectifier bridge; the anode of the first diode D1, the cathode of the second diode D2 and the collector or drain of the first switching device Q1 are connected as the first phase input of the three-phase fully controlled rectifier bridge; the anode of the third diode D3, the cathode of the fourth diode D4 and the collector or drain of the third switching device Q3 are connected as the second phase input of the three-phase fully controlled rectifier bridge; the anode of the fifth diode D5, the cathode of the sixth diode D6 and the collector or drain of the fifth switching device Q5 are connected as the third phase input of the three-phase fully controlled rectifier bridge; the collector or drain of the second switching device Q2, the collector or drain of the fourth switching device Q4 and the collector or drain of the sixth switching device Q6 are connected to the zero line of three-phase power.

What is claimed is:

1. A three-phase boost rectifier circuit, comprising:
   first battery packs BAT+, second battery packs BAT−, and a boost rectifier module;
   wherein the boost rectifier module comprises
      a first bidirectional thyristor SCR1,
      a second bidirectional thyristor SCR2,
      a third bidirectional thyristor SCR3,
      a fourth bidirectional thyristor SCR6,
      a first unidirectional thyristor SCR4,
      a second unidirectional thyristor SCR5,
      a first inductor L1,
      a second inductor L2,
      a third inductor L3,
      a three-phase fully controlled rectifier bridge,
      a first capacitor C1 and a second capacitor C2;
   wherein one end of the first bidirectional thyristor SCR1, one end of the second bidirectional thyristor SCR2 and one end of the third bidirectional thyristor SCR3 are respectively connected to a first phase of a three-phase power, a second phase of the three-phase power and a third phase of the three-phase power; an anode of the first unidirectional thyristor SCR4 and a cathode of the second unidirectional thyristor SCR5 are respectively connected to a positive end of the first battery packs BAT+ and a negative end of the second battery packs BAT−; a negative end of the first battery packs BAT+, a positive end of the second battery packs BAT− and one end of the fourth bidirectional thyristor SCR6 are connected to a zero line of the three-phase power; a cathode of the first unidirectional thyristor SCR4 and the other end of the first bidirectional thyristor are both connected to one end of the first inductor L1; the other end of the second bidirectional thyristor SCR2 and the other end of the fourth bidirectional thyristor SCR6 are both connected to one end of the second inductor L1 the other end of the third bidirectional thyristor SCR3 and an anode of the second unidirectional thyristor SCR5 are both connected to one end of the third inductor L3; the other end of the first inductor L1, the other end of the second inductor L2 and other end of the third inductor L3 are respectively connected to the three-phase inputs of the three-phase fully controlled rectifier bridge; two outputs of the three-phase fully controlled rectifier bridge are respectively connected to one end of the first capacitor C1 and one end of the second capacitor C2; the other end of the first capacitor C1 and the other end of the second capacitor C2 are both connected to the zero line of the three-phase power.

2. The three-phase boost rectifier circuit according to claim 1, wherein, the three-phase fully controlled rectifier bridge is two-level power supplied three-phase bridge topology, wherein the three-phase bridge topology comprises a first switching device, a second switching device, a third switching device, a fourth switching device, a fifth switching device, a sixth switching device; a collector or drain of the first switching device, a collector or drain of the third switching device and a collector or drain of the fifth switching device are connected as a first output of the three-phase fully controlled rectifier bridge; a transmitter or source of the second switching device, a transmitter or source of the fourth switching device and a transmitter or source of the sixth switching device are connected as a second output of the three-phase fully controlled rectifier bridge; a transmitter or source of the first switching device is connected with a collector or drain of the second switching device as a first phase input of the three-phase fully controlled rectifier bridge; a transmitter or source of the third switching device is connected with a collector or drain of the fourth switching device as a second phase input of the three-phase fully controlled rectifier bridge; a transmitter or source of the fifth switching device is connected with a collector or drain of the sixth switching device as a third phase input of the three-phase fully controlled rectifier bridge.

3. The three-phase boost rectifier circuit according to claim 1, wherein, the three-phase fully controlled rectifier bridge is three-level power supplied three-phase half bridge topology, wherein the three-phase half bridge topology is I-type three-level inverting topology unit, or T-type three-level inverting topology unit.

4. The three-phase boost rectifier circuit according to claim 3, wherein, the three-level power supplied three-phase half bridge topology is the I-type three-level inverting topology unit, wherein the I-type three-level inverting topology unit comprises a first switching device, a second switching device, a third switching device, a fourth switching device, a fifth switching device, a sixth switching device, a seventh switching device, an eighth switching device, a ninth switching device, a tenth switching device, a eleventh switching device, a twelfth switching device a first diode, a second diode, a third diode, a fourth diode, a fifth diode, and a sixth diode;
   wherein a transmitter or source of the first switching device and a collector or drain of the second switching device are both connected to a cathode of the first diode; a transmitter or source of the fifth switching device and a collector or drain of the sixth switching device are both connected to a cathode of the third diode; a transmitter or source of the ninth switching device and a collector or drain of the tenth switching device are both connected to a cathode of the fifth diode; a transmitter or source of the third switching device and a collector or drain of the fourth switching device are both connected to an anode of the second diode; a transmitter or source of the seventh switching device and a collector or drain of the eighth switching device are both connected to an anode of the fourth diode; a transmitter or source of the eleventh switching device and a collector or drain of the twelfth switching device are both connected to an anode of the sixth diode; an anode of the first diode is connected with a cathode of the second diode; an anode of the third diode is connected with a cathode of the fourth diode; an anode of the fifth diode is connected with a cathode of the sixth diode; a collector or drain of the first switching device, a collector or drain of the fifth switching device and a collector or drain of the ninth switching device are connected as a first output of the three-phase fully controlled rectifier bridge; a transmitter or source of the fourth switching device, a transmitter or source of the eighth switching device and a transmitter or source of the twelfth switching device are connected as a second output of the three-phase fully controlled rectifier bridge; a transmitter or source of the second switching device and a collector or drain of the third switching device are connected as a first phase input of the three-phase fully controlled rectifier bridge; a transmitter or source of the sixth switching device and a collector or drain of the seventh switching device are connected as a second phase input of the three-phase fully controlled rectifier bridge; a transmitter or source of the tenth switching device and a collector or drain of the eleventh switching device are connected as a third phase input of the three-phase fully controlled rectifier bridge; an anode of the first diode, an anode of the second diode and an anode of the third diode are connected to the zero line of the three-phase power.

5. The three-phase boost rectifier circuit according to claim 3, wherein, the three-level power supplied three-phase half bridge topology is the T-type three-level inverting topology unit, wherein the T-type three-level inverting topology unit comprises a first switching device, a second switching device, a third switching device, a fourth switching device, a fifth switching device, a sixth switching device, a first diode, a second diode, a third diode, a fourth diode, a fifth diode, and a sixth diode:
wherein a transmitter or source of the first switching device is connected with a transmitter or source of the second switching device, a transmitter or source of the third switching device is connected with a transmitter or source of the fourth switching device, a transmitter or source of the fifth switching device is connected with a transmitter or source of the sixth switching device; a cathode of the first diode, a cathode of the third diode and a cathode of the fifth diode are connected as a first output of the three-phase fully controlled rectifier bridge; an anode of the second diode, an anode of the fourth diode and an anode of the sixth diode are connected as a second output of the three-phase fully controlled rectifier bridge; an anode of the first diode, a cathode of the second diode and a collector or drain of the first switching device are connected as a first phase input of the three-phase fully controlled rectifier bridge; an anode of the third diode, a cathode of the fourth diode and a collector or drain of the third switching device are connected as a second phase input of the three-phase fully controlled rectifier bridge; an anode of the fifth diode, a cathode of the sixth diode and a collector or drain of the fifth switching device are connected as a third phase input of, the three-phase fully controlled rectifier bridge; a collector or drain of the second switching device, a collector or drain of the fourth switching device and a collector or drain of the sixth switching device are connected to the zero line of the three-phase power.

6. The three-phase boost rectifier circuit according to claim 2, wherein,
the first bidirectional thyristor SCR1, the second bidirectional thyristor SCR2, the third bidirectional thyristor SCR3, the first inductor L1 the second inductor L2, the third inductor L3, the first switching device, the second switching device, the third switching device, the fourth switching device, the fifth switching device, the sixth switching device, the first capacitor C1 and the second capacitor C2 form a first rectifier boost power stage circuit in a commercial power supply mode;
the first battery packs BAT+, the second battery packs BAT−, the first unidirectional thyristor SCR4, the second unidirectional thyristor SCR5, the first inductor L1, the third inductor L3, the first switching device, the second switching device, the fifth switching device, the sixth switching device, the first capacitor C1 and the second capacitor C2 form a second rectifier boost power stage circuit in a battery-operated mode.

7. A method for controlling the three-phase boost rectifier circuit of claim 6, the method comprising:
when a commercial power supply is normal, making the first bidirectional thyristor SCR1, the second bidirectional thyristor SCR2 and the third bidirectional thyristor SCR3 in a closed-state while making the first unidirectional thyristor SCR4, the second unidirectional thyristor SCR5, the fourth bidirectional thyristor SCR6 in an open-state; the three-phase boost rectifier circuit working in the commercial power supply mode;
when the commercial power supply is abnormal, making the first bidirectional thyristor SCR1, the second bidirectional thyristor SCR2, the third bidirectional thyristor SCR3, the first switching device and the sixth switching device in an open-state while making the first unidirectional thyristor SCR4 and the second unidirectional thyristor SCR5 in a closed-state; the three-phase boost rectifier circuit working in the battery-operated mode.

8. The control method according to claim 7, wherein, the commercial power supply mode comprises the following stages:
when a first phase's voltage of the three-phase power is in a positive half cycle, the first switching device is in an open-state; in a first stage, the second switching device in a closed-state; the first phase's voltage of the three-phase power charges the first inductor L1 through a circuit consisting of the first bidirectional thyristor SCR1, the first inductor L1, the second switching device and the second capacitor C2; in a second stage, the second switching device is in an open-state; the first inductor L1 discharges and a discharge current of the first inductor L1 charges the first capacitor C1 through a circuit consisting of a body diode of the first switching device, the first capacitor C1, the first bidirectional thyristor SCR1 and the first inductor L1;
when the first phase's voltage of the three-phase power is in a negative half cycle, the second switching device is in an open-state; in a third stage, the first switching device is in a closed-state; the first phase's voltage of the three-phase power charges the first inductor L1 through a circuit consisting of the first bidirectional thyristor SCR1, the first inductor L1, the first switching device and the first capacitor C1; in a fourth stage, the first switching device is in an open-state; the first inductor L1 discharges and the discharge current of the first inductor L1 charges the second capacitor C2 through a circuit consisting of a body diode of the second switching device, the second capacitor C2, the first bidirectional thyristor SCR1 and the first inductor L1;

when a second phase's voltage of the three-phase power is in a positive half cycle, the third switching device is in an open-state; in a first stage, the fourth switching device is in a closed-state; the second phase's voltage of the three-phase power charges the second inductor L2 through a circuit consisting of the second bidirectional thyristor SCR2, the second inductor L2, the fourth switching device and the second capacitor C2; in a second stage, the fourth switching device in an open-state; the second inductor L2 discharges and a discharge current of the second inductor L2 charges the first capacitor C1 through a circuit consisting of a body diode of the third switching device, the first capacitor C1, the second bidirectional thyristor SCR2 and the second inductor L2;

when the second phase's voltage of the three-phase power is in a negative half cycle, the fourth switching device is in an open-state; in a third stage, the third switching device is in a closed-state; the second phase's voltage of the three-phase power charges the second inductor L2 through a circuit consisting of the second bidirectional thyristor SCR2, the second inductor L2, the third switching device and the first capacitor C1; in a fourth stage, the third switching device is in an open-state; the second inductor L2 discharges and a discharge current of the second inductor L2 charges the second capacitor C2 through a circuit consisting of a body diode of the fourth switching device, the second capacitor C2, the second bidirectional thyristor SCR2 and the second inductor L2;

when the third phase's voltage of the three-phase power is in a positive half cycle, the fifth switching device is in an open-state; in a first stage, the sixth switching device is in a closed-state; the third phase's voltage of the three-phase power charges the third inductor L3 through a circuit consisting of the third bidirectional thyristor SCR3, the third inductor L3, the sixth switching device and the second capacitor C2; in a second stage, the sixth switching device is in an open-state; the third inductor L3 discharges and a discharge current of the third inductor L3 charges the first capacitor C1 through a circuit consisting of a body diode of the fifth switching device, the first capacitor C1, the third bidirectional thyristor SCR3 and the third inductor L3;

when the third phase's voltage of the three-phase power is in a negative half cycle, the sixth switching device is in an open-state; in a third stage, the fifth switching device is in a closed-state; the third phase's voltage of the three-phase power charges the third inductor L3 through a circuit consisting of the third bidirectional thyristor SCR3, the second inductor L2, the fifth switching device and the first capacitor C1; in a fourth stage, the third switching device is in an open-state; the third inductor L3 discharges and a discharge current of the third inductor L3 charges the second capacitor C2 through a circuit consisting of a body diode of the sixth switching device, the second capacitor C2, the third bidirectional thyristor SCR3 and the third inductor L3.

9. The control method according to claim 7, wherein, the battery-operated mode comprises the following stages:

in a first stage, the second switching device and the fifth switching device are in a closed-state; the first inductor L1 charges through a circuit consisting of the first battery packs BAT+, the first unidirectional thyristor SCR4, the first inductor L1, the second switching device and the second capacitor C2; the third inductor L3 charges through a circuit consisting of the second battery packs BAT−, the first capacitor C1, the fifth switching device, the third inductor L3 and the second unidirectional thyristor SCR5;

in a second stage, the second switching device and the fifth switching device are in an open-state; the first inductor L1 discharges and discharge current of the first inductor L1 charges the first capacitor C1 through a circuit consisting of a body diode of the first switching device, the first capacitor C1, the first battery packs BAT+, the first unidirectional thyristor SCR4 and the first inductor L1; the third inductor L3 discharges and a discharge current of the third inductor L3 charges the second capacitor C2 through a circuit consisting of the second unidirectional thyristor SCR5, the second battery packs BAT−, the second capacitor C2, a body diode of the sixth switching device and the third inductor L3.

10. The control method according to claim 7, wherein, when the three-phase boost rectifier circuit works in the battery-operated mode, a balanced bridge circuit consisting of the fourth bidirectional thyristor SCR6, the second inductor L2, the third switching device and the fourth switching device works, in order to keep a residual capacity of the first battery packs BAT+ as same as a residual capacity of the second battery packs BAT, and maintain a load balance of the positive and negative DC bus.

11. The control method according to claim 10, wherein, the balanced bridge circuit consisting of the fourth bidirectional thyristor SCR6, the second inductor L2, the third switching device and the fourth switching device works, the control method comprising the following steps:

step one: making a real-time detection of a current value of the first battery packs BAT+, a current value of the second battery packs BAT−, a voltage value of the first battery packs BAT+ and a voltage value of the second battery packs BAT−;

step two: calculating the residual capacity of the first battery packs BAT+, the residual capacity of the second battery packs BAT−, as well as a ratio K of the residual capacity of the first battery packs BAT+ and the residual capacity of the second battery packs BAT−, where $K \geq 0$;

step three: making the fourth bidirectional thyristor SCR6, the third switching device and the fourth switching device work according to a value of ratio K.

12. The control method according to claim 11, wherein, the step three includes:

when $0 \leq K < 1$, making the fourth bidirectional thyristor SCR6 in a closed-state while the third switching device in an open-state; in a first stage, making the fourth switching device in a closed-state while the second inductor L2 charging through a circuit consisting of the fourth switching device, the second capacitor C2, the fourth bidirectional thyristor SCR6 and the second inductor L2; in a second stage, making the fourth switching device in an open-state, while the first capacitor C1 charging through a circuit consisting of the first capacitor C1, the fourth bidirectional thyristor SCR6, the second inductor L2 and a body diode of the third switching device;

when K=1, making the fourth bidirectional thyristor SCR6, the third switching device and the fourth switching device in an open state;

when K>1, making the fourth bidirectional thyristor SCR6 in a closed-state while the fourth switching device in an open-state; in a first stage, making the third switching device in a closed-state while the second inductor L2 charging through a circuit consisting of the first capacitor C1, the third switching device, the second inductor L2 and the fourth bidirectional thyristor SCR6; in a second stage, making the third switching device in an open-state while the second capacitor C2 charging through a circuit consisting of a body diode of the fourth switching device, the second inductor L2, the fourth bidirectional thyristor SCR6 and the second capacitor C2.

13. An uninterrupted power supply, comprising a three-phase boost rectifier circuit and an inverter module, wherein inputs of the inverter module are connected with outputs of the three-phase boost rectifier circuit, wherein the three-phase boost rectifier circuit includes
first battery packs BAT+, second battery packs BAT−, and
a boost rectifier module;
wherein the boost rectifier module includes
a first bidirectional thyristor SCR1,
a second bidirectional thyristor SCR2,
a third bidirectional thyristor SCR3,
a fourth bidirectional thyristor SCR6,
a first unidirectional thyristor SCR4,
a second unidirectional thyristor SCR5,
a first inductor L1,
a second inductor L2,
a third inductor L3,
a three-phase fully controlled rectifier bridge,
a first capacitor C1 and a second capacitor C2;
wherein one end of the first bidirectional thyristor SCR1, one end of the second bidirectional thyristor SCR2 and one end of the third bidirectional thyristor SCR3 are respectively connected to a first phase of a three-phase power, a second phase of the three-phase power and, a third phase, of the three-phase power; an anode, of the first unidirectional thyristor SCR4 and a cathode of the second unidirectional thyristor SCR5 are respectively connected to a positive end of the first battery packs BAT+ and a negative end of the second battery packs BAT−; a negative end of the first battery packs BAT+, a positive end of the second battery packs BAT− and one end of the fourth bidirectional thyristor SCR6 are connected to a zero line of the three-phase power; a cathode of the first unidirectional thyristor SCR4 and the other end of the first bidirectional thyristor are both connected to one end of the first inductor L1; the other end of the second bidirectional thyristor SCR2 and the other end of the fourth bidirectional thyristor SCR6 are both connected to one end of the second inductor L2; the other end of the third bidirectional thyristor SCR3 and an anode of the second unidirectional thyristor SCR5 are both connected to one end of the third inductor L3; the other end of the first inductor L1, the other end of the second inductor L2 and the other end of the third inductor L3 are respectively connected to three-phase inputs of the three-phase fully controlled rectifier bridge; two outputs of the three-phase fully controlled rectifier bridge are respectively connected to one end of the first capacitor C1 and one end of the second capacitor C2 the other end of the first capacitor C1 and the other end of the second capacitor C2 are both connected to the zero line of the three-phase power.

14. The uninterrupted power supply according to claim 13, wherein, the three-phase fully controlled rectifier bridge is two-level power supplied three-phase bridge topology, wherein the three-phase bridge topology comprises a first switching device, a second switching device, a third switching device, a fourth switching device, a fifth switching device, a sixth switching device, a collector or drain of the first switching device, a collector or drain of the third switching device and a collector or drain of the fifth switching device are connected as a first output of the three-phase fully controlled rectifier bridge; a transmitter or source of the second switching device, a transmitter or source of the fourth switching device and a transmitter or source of the sixth switching device are connected as a second output of the three-phase fully controlled rectifier bridge; a transmitter or source of the first switching device is connected with a collector or drain of the second switching device as a first phase input of the three-phase fully controlled rectifier bridge; a transmitter or source of the third switching device is connected with a collector or drain of the fourth switching device as a second phase input of the three-phase fully controlled rectifier bridge; a transmitter or source of the fifth switching device is connected with a collector or drain of the sixth switching device as a third phase input of the three-phase fully controlled rectifier bridge.

15. The uninterrupted power supply according to claim 13, wherein, the three-phase fully controlled rectifier bridge is three-level power supplied three-phase half bridge topology, wherein the three-phase half bridge topology is I-type three-level inverting topology unit, or T-type three-level inverting topology unit.

16. The uninterrupted power supply according to claim 15, wherein, the three-level power supplied three-phase half bridge topology is the I-type three-level inverting topology unit, wherein the I-type three-level inverting topology unit comprises a first switching device, a second switching device, a third switching device, a fourth switching device, a fifth switching device, a sixth switching device, a seventh switching device, an eighth switching device, a ninth switching device, a tenth switching device, a eleventh switching device, a twelfth switching device, a first diode, a second diode, a third diode, a fourth diode, a fifth diode, and a sixth diode;

wherein a transmitter or source of the first switching device and a collector or drain of the second switching device are both connected to a cathode of the first diode; a transmitter or source of the fifth switching device and a collector or drain of the sixth switching device are both connected to a cathode of the third diode; a transmitter or source of the ninth switching device and a collector or drain of the tenth switching device are both connected to a cathode of the fifth diode; a transmitter or source of the third switching device and a collector or drain of the fourth switching device are both connected to an anode of the second diode; a transmitter or source of the seventh switching device and a collector or drain of the eighth switching device are both connected to an anode of the fourth diode; a transmitter or source of the eleventh switching device and a collector or drain of the twelfth switching device are both connected to an anode of the sixth diode; an anode of the first diode is connected with a cathode of the second diode; an anode of the third, diode is connected with a cathode of the fourth diode; an anode of the fifth diode is connected with a cathode of the sixth diode; a collector or drain of the first switching device a collector or drain of the fifth switching device and a collector or drain of the ninth switching device are connected as a first output of the three-phase fully controlled rectifier bridge; a transmitter or source of the fourth switching device, a transmitter or source of the eighth switching device and a transmitter or source of the twelfth switching device are connected as a second output of the three-phase fully controlled rectifier bridge; a transmitter or source of the second switching device and a collector or drain of the third switching device are connected as a first phase input of the three-phase fully controlled rectifier bridge; a transmitter or source of the sixth switching device and a collector or drain of the seventh switching device are connected as a second phase input of the three-phase fully controlled rectifier bridge; a transmitter or source of the tenth switching device and a collector or drain of the eleventh switching device are connected as a third phase input of the three-phase fully controlled rectifier bridge; an anode of the first diode, an anode of the second diode and an anode of the third diode are connected to the zero line of the three-phase power.

17. The uninterrupted power supply according to claim 15, wherein, the three-level power supplied three-phase half bridge topology is the T-type three-level inverting topology unit, wherein the T-type three-level inverting topology unit comprises a first switching device, a second switching device, a third switching device, a fourth switching device, a fifth switching device, a sixth switching device, a first diode, a second diode, a third diode, a fourth diode, a fifth diode, and a sixth diode;

wherein a transmitter or source of the first switching device is connected with a transmitter or source of the second switching device, a transmitter or source of the third switching device is connected with a transmitter or source of the fourth switching device, a transmitter or source of the fifth switching device is connected with a transmitter or source of the sixth switching device; a cathode of the first diode, a cathode of the third diode and a cathode of the fifth diode are connected as a first output of the three-phase hilly controlled rectifier bridge; an anode of the second diode, an anode of the fourth diode and an anode of the sixth diode are connected as a second output of the three-phase fully controlled rectifier bridge; an anode of the first diode, a cathode of the second diode and a collector or drain of the first switching device, are connected as a first phase input of the three-phase fully controlled rectifier bridge; an anode of the third diode, a cathode of the fourth diode and a collector or drain of the third switching device are connected as a second phase input of the three-phase fully controlled rectifier bridge; an anode of the fifth diode, a cathode of the sixth diode and a collector or drain of the fifth switching device are connected as a third phase input of the three-phase fully controlled rectifier bridge; a collector or drain of the second switching device, a collector or drain of the fourth switching device and a collector or drain of the sixth switching device are connected to the zero line of the three-phase power.

18. The uninterrupted power supply according to claim 14, wherein, the first bidirectional thyristor SCR1, the second bidirectional thyristor SCR2, the third bidirectional thyristor SCR3, the first inductor L1, the second inductor L2, the third inductor L3, the first switching device, the second switching device, the third switching device, the fourth switching device, the fifth switching device, the sixth switching device, the first capacitor C1 and the second capacitor C2 form a first rectifier boost power stage circuit in a commercial power supply mode;

the first battery packs BAT+, the second battery packs BAT−, the first unidirectional thyristor SCR4, the second unidirectional thyristor SCR5, the first inductor L1, the third inductor L3, the first switching device; the second switching device, the fifth switching device, the sixth switching device, the first capacitor C1 and the second capacitor C2 form a second rectifier boost power stage circuit in a battery-operated mode.

* * * * *